Dec. 7, 1971     F. A. GEDDIE     3,624,940

INVERTIBLE VARIABLE DISPLAY

Filed June 24, 1970

INVENTOR.
FRANK A. GEDDIE

United States Patent Office 3,624,940
Patented Dec. 7, 1971

3,624,940
INVERTIBLE VARIABLE DISPLAY
Frank Alexander Geddie, 4900 Old Brook Road, Apt. 6,
Richmond, Va. 23227
Filed June 24, 1970, Ser. No. 49,271
Int. Cl. G09f 11/00
U.S. Cl. 40—28                                    4 Claims

ABSTRACT OF THE DISCLOSURE

A hollow transparent ball has two oppositely disposed flats whereby the ball can be held in place by resting on either flat. Means in the ball provide a first display when the ball rests on one flat and provide a second display automatically changed from either one to the other when the ball is inverted from its original position.

SUMMARY OF THE INVENTION

My invention, which I call "invertible variable display," can be used as a paper weight, an ornament, a child's toy, as a novelty item or souvenir, or even for advertising purposes.

I provide a hollow transparent spheroid, typically a sphere but subject to modification of this shape to a football or the like. The spheroid has two oppositely disposed flat regions whereby the spheroid can be held upright when either flat region rests upon a horizontal flat surface.

First means in the spheroid assumes a first position when the spheroid rests on one flat and assumes a second position when the spheroid rests on the opposite flat. Second means, responsive to the first means when in the first position, creates a first display. Third means, responsive to the first means when in the second position, creates a second display.

The net result is that the viewer of the spheroid can see either one of the displays as desired by placing the spheroid with a selected flat region disposed on a suitable surface. Moreover, the display can be changed by inverting the spheroid and placing the other flat region on the surface.

DETAILED DESCRIPTION OF PREFERRED EMBODIMENTS

Figure 1:
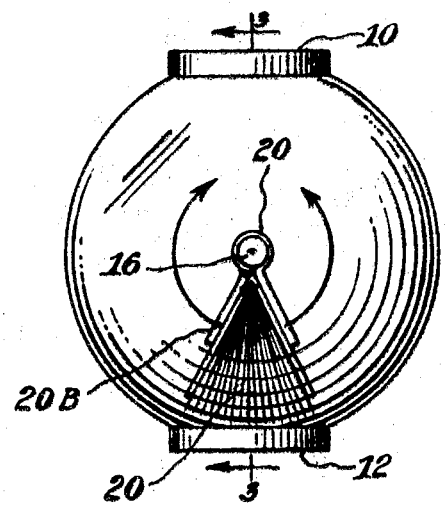
FIG. 1 is a side view of my invention shown in one position.
Figure 5:
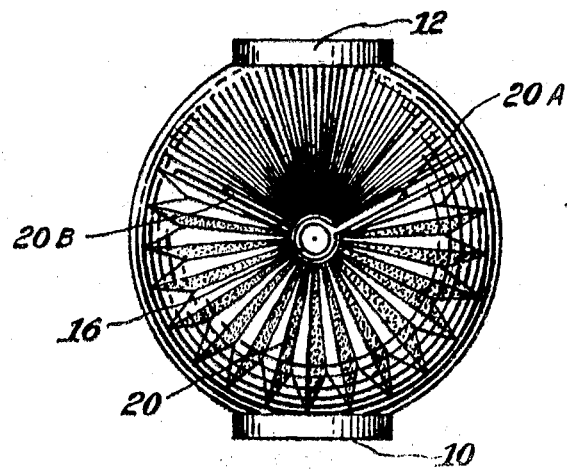
FIG. 5 is a view of the invention of FIG. 1 in reverse position.
Figure 2:
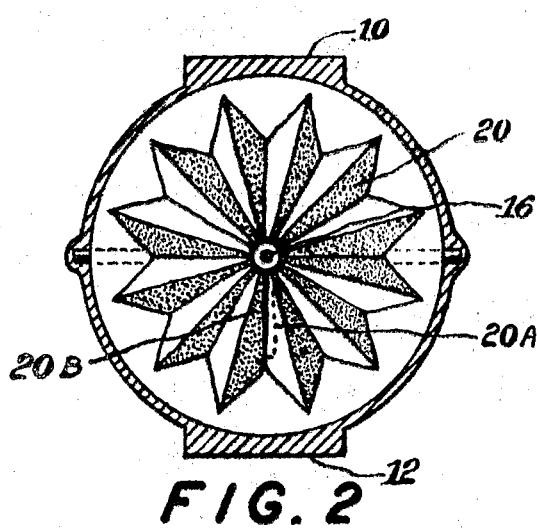
FIG. 2 shows a modification of FIG. 1 in reverse position.
Figure 3:
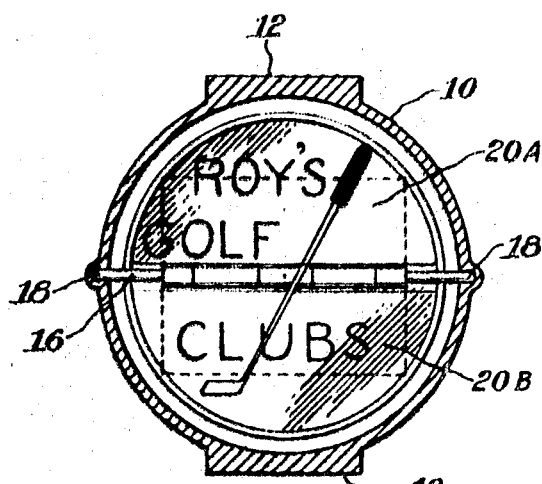
FIG. 3 is a cross section taken along line 3—3 in FIG. 1.
Figure 6:
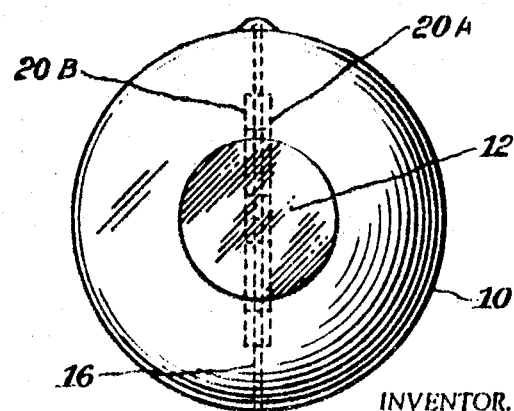
FIG. 6 is a reverse view of the structure shown in FIG. 3.
Figure 4:
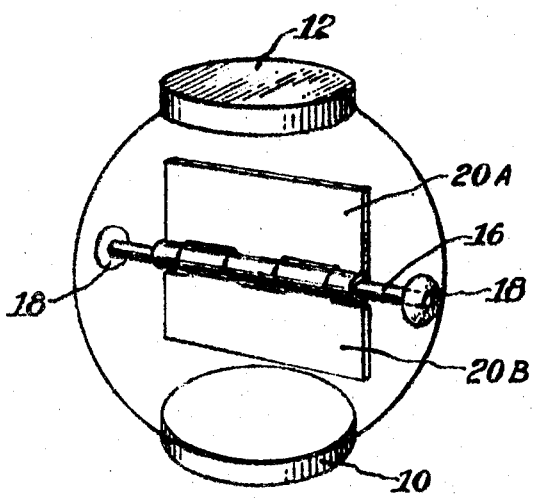
FIG. 4 is a bottom view of another form of my invention.

Referring now to FIGS. 1–6, a hollow transparent sphere 10 has oppositely disposed circular flat sections 12 and 14. A horizontal rod 16 extends diametrically across the sphere in a direction perpendicular to a diameter extending between and perpendicular to the flat sections, this rod being rotatably journalled in suitable bearings 18 disposed in opposite ends. This rod serves as the axis for a hinge 20 secured thereto. The halves 20A and 20B of the hinge assume one position when the sphere rests on section 12 and a second position when the sphere rests on section 14. These halves change position by gravity action when the sphere is inverted.

Accordion paper 22 can be disposed between halves 20A and 20B, being contacted when the sphere rests on one section 12 and expanded when the sphere rests on the other section 10.

Alternatively, one half 20A can remain in fixed position while the other half 20B can pivot either into contact with half 20A or 180° out of contact depending upon the section supporting the sphere.

The two positions of the hinge thus obtained can be used for controlling any two different displays for any purpose.

While I have described my invention with particular reference to the drawings, such is not to be considered as limiting its actual scope.

Having thus described this invention, what is asserted as new is:

1. A device adapted for use as a paper weight, an ornament, a child's top, a novelty item or other purposes, said device comprising:
    a hollow transparent spheroid provided with two oppositely disposed outer flat regions whereby the spheroid will be held erect when either region rests on a flat horizontal surface;
    first means which includes a rod extending as a horizontal diameter within the spheroid in a direction perpendicular to another diameter extending perpendicularly between said regions and which assumes a first position when the spheroid extends upward from one region resting on the surface and which assumes a second position when the spheroid is inverted and extends upward from the other region resting on the surface; and
    second means coupled to the first means to produce a first display in the spheroid when the first means is in the first position and to produce a second display when the first means is in the second position.

2. A device as set forth in claim 1 wherein the first means includes a hinge disposed about the rod as an axis.

3. A device as set forth in claim 2 wherein the hinge has two halves which are disposed in one relative position to define the first position and which are disposed in another relative position to define the second position.

4. A device as set forth in claim 3 wherein the halves are in contact in one relative position and are apart in the other relative position.

References Cited

UNITED STATES PATENTS

| 1,286,657 | 12/1918 | Lambert | 40—327 X |
| 2,645,486 | 7/1953 | Monahan | 40—327 X |
| 3,049,814 | 8/1962 | McLain | 46—24 UX |

FOREIGN PATENTS

| 914,353 | 7/1954 | Germany | 273—58.8 |
| 633,532 | 12/1949 | Great Britain | 40—67 |

ROBERT W. MICHELL, Primary Examiner
W. J. CONTRERAS, Assistant Examiner